United States Patent
Lee et al.

(10) Patent No.: US 8,657,480 B2
(45) Date of Patent: Feb. 25, 2014

(54) DISPLAY APPARATUS

(75) Inventors: Sang-Hoon Lee, Cheonan-si (KR);
Se-Ki Park, Asan-si (KR); Jae-Joong Kwon, Suwon-si (KR); Seung-Mo Kim, Yongin-si (KR); Cheol-Yong Noh, Asan-si (KR); Kang-Woo Lee, Suwon-si (KR); Sung-Wook Kang, Seoul (KR)

(73) Assignee: Samsung Display Co., Ltd. (KR)

( * ) Notice: Subject to any disclaimer, the term of this patent is extended or adjusted under 35 U.S.C. 154(b) by 220 days.

(21) Appl. No.: 12/430,923

(22) Filed: Apr. 28, 2009

(65) Prior Publication Data

US 2010/0142220 A1    Jun. 10, 2010

(30) Foreign Application Priority Data

Dec. 9, 2008  (KR) ................. 10-2008-0124618

(51) Int. Cl.
*F21V 7/04* (2006.01)

(52) U.S. Cl.
USPC ........................... 362/625; 362/97.1

(58) Field of Classification Search
USPC .......... 362/97.1–97.4, 600–634, 26, 29, 97.2, 362/223, 217.09, 297, 307; 349/62, 64, 65, 349/67

See application file for complete search history.

(56) References Cited

U.S. PATENT DOCUMENTS

| | | | | |
|---|---|---|---|---|
| 4,767,172 A | * | 8/1988 | Nichols et al. | 385/146 |
| 6,570,710 B1 | * | 5/2003 | Nilsen et al. | 359/625 |
| 6,633,351 B2 | * | 10/2003 | Hira et al. | 349/95 |
| 2001/0012202 A1 | * | 8/2001 | Yamada et al. | 362/31 |
| 2005/0117322 A1 | * | 6/2005 | Takata | 362/31 |
| 2006/0077692 A1 | * | 4/2006 | Noh et al. | 362/625 |
| 2007/0121318 A1 | * | 5/2007 | Nanbu | 362/228 |

FOREIGN PATENT DOCUMENTS

| | | | |
|---|---|---|---|
| JP | 08171806 A | | 7/1996 |
| JP | 11337728 A | * | 12/1999 |
| KR | 200240563 Y1 | | 7/2001 |
| KR | 1020040009603 A | | 1/2004 |

* cited by examiner

*Primary Examiner* — Jason Moon Han
*Assistant Examiner* — Danielle Allen
(74) *Attorney, Agent, or Firm* — Cantor Colburn LLP

(57) ABSTRACT

A display apparatus includes a display panel which displays images, a light source unit which generates and emits a light, a reflective sheet disposed below the display panel, and a plate disposed between the reflective sheet and the display panel. The reflective sheet includes a light diffusion pattern provided on an upper surface thereof facing the display panel, which diffusely reflects the light, to guide the light provided from the light source unit toward the display panel. The plate is spaced apart from the reflective sheet by a predetermined distance and includes a plurality of prisms provided on a lower surface thereof facing the reflective sheet to selectively reflect and transmit the light, which is provided from both the light source unit and the reflective sheet, according to an incident angle of the light.

19 Claims, 18 Drawing Sheets

120°

90°

Fig. 7C
Fig. 7D
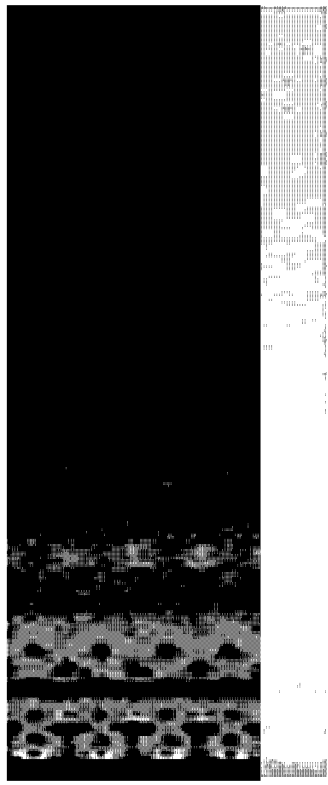
70°
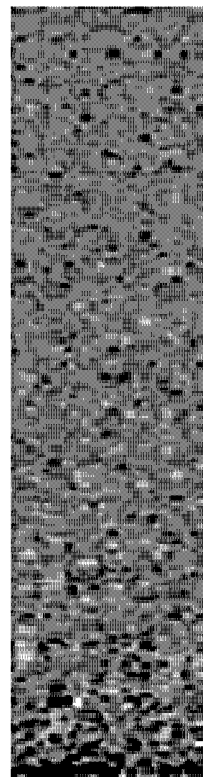
60°

40°

30°

2mm

3mm

4mm

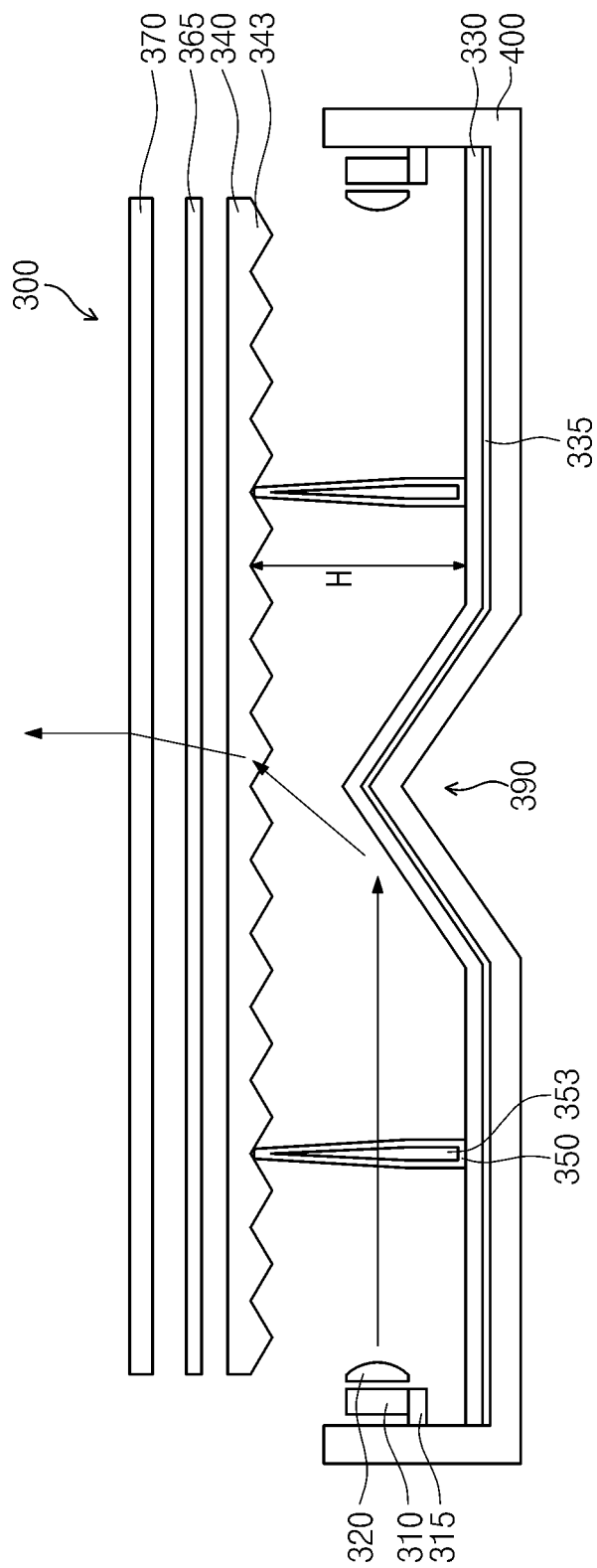

DISPLAY APPARATUS

This application claims priority to Korean Patent Application No. 2008-124618 filed on Dec. 9, 2008, and all the benefits accruing therefrom under 35 U.S.C. §119, the contents of which are herein incorporated by reference in their entirety.

BACKGROUND OF THE INVENTION

1. Field of the Invention

The present invention relates to a display apparatus. More particularly, the present invention relates to a slim display apparatus.

2. Description of the Related Art

A liquid crystal display ("LCD") has been extensively used due to characteristics such as slimness, light weight and low power consumption. The LCD includes an LCD panel which displays images, a backlight unit which supplies a light to the LCD panel, and a driving circuit which applies a driving signal to the LCD panel.

The backlight unit is classified into a direct illumination type backlight unit and an edge illumination type backlight unit according to a scheme of supplying a light to the LCD panel. In the direct illumination type backlight unit, a plurality of light sources is provided below and overlapping the LCD panel to directly supply a light to the LCD panel. The direct illumination type backlight unit represents high power consumption and has thick thickness. In the edge illumination type backlight unit, a light source is provided at a side surface of the LCD panel to supply the LCD panel with a light using a light guide plate. The edge illumination type backlight unit represents low power consumption and has reduced thickness as compared with the direct illumination type backlight unit.

As the LCD has been fabricated in a relatively large size and a slim structure, thickness of the light source and the light guide plate has become reduced to achieve the edge illumination type backlight unit having the slim structure. As a size of the light guide plate is increased, the light guide plate having thin thickness may be bent. Thus, brightness of a light, which is guided toward the LCD panel from the light source through the light guide plate, may not be uniform, so light guide performance of the light guide plate may be degraded.

BRIEF SUMMARY OF THE INVENTION

Exemplary embodiments of the present invention provide a display apparatus capable of guiding a lateral light without using a light guide plate.

In an exemplary embodiment of the present invention, a display apparatus includes a display panel which displays images, a light source unit which emits a light, a reflective sheet disposed below the display panel, and a plate disposed between the reflective sheet and the display panel.

The reflective sheet includes a light diffusion pattern provided on an upper surface thereof facing the display panel, which diffusely reflects the light, to guide the light provided from the light source unit toward the display panel. The reflective sheet includes a material to specularly reflect the light.

The plate is spaced apart from the reflective sheet by a predetermined distance and includes a plurality of prisms provided on a lower surface thereof facing the reflective sheet, to selectively reflect and output the light, which is provided from both the light source unit and the reflective sheet, according to an incident angle of the light.

The light source unit includes a light source and a collimator. The light source generates the light. The collimator refracts the light to control an exit angle of the light emitted from the light source. The collimator is a convex lens to control the exit angle of the light in a range of about 100 to about 60°. The light source unit further includes a light source substrate on which a light emitting diode serving as the light source is mounted. The light emitting diode may be integrally formed with the collimator.

The plate is spaced apart from the reflective sheet by a distance of about 4 millimeters (mm) or more to efficiently guide the light. The prisms are longitudinally extended substantially in parallel to a travelling direction of the light emitted from the light source unit.

The plate includes a light transmission pattern provided on an upper surface thereof facing the display panel, to improve light transmittance. The light transmission pattern includes ink, which includes one of polyvinyl chloride and acryl, and diffuser mixed with the ink.

The display apparatus further includes a supporter interposed between the reflective sheet and the plate to support the plate. The supporter includes a hole passing through a body of the supporter in a direction substantially perpendicular to a longitudinal direction of the supporter.

The display apparatus further includes a bottom chassis which receives the light source unit, the reflective sheet, and the plate therein. The reflective sheet further includes a protrusion partially protruding toward the plate.

In an exemplary embodiment of the present invention, a display apparatus includes a display panel which displays images, a light source unit which emits a light, a reflective sheet disposed below the display panel, and a plate disposed above the reflective sheet.

The reflective sheet includes a light diffusion pattern provided on an upper surface thereof, which diffusely reflects the light, to guide the light provided from the light source unit toward the display panel. The reflective sheet includes a material to specularly reflect the light.

The diffusion plate is spaced apart from the reflective sheet by a predetermined distance, and includes a plurality of light reflection patterns provided on a lower surface thereof, which reflect the light, to selectively reflect and transmit the light, which is provided from both the light source unit and the reflective sheet, according to an incident angle of the light.

The light reflection patterns of the diffusion plate arranged in a light incident area adjacent to the light source unit have relatively large planar areas as compared with the light reflection patterns arranged in a center portion of the diffusion plate. The light reflection patterns include one of metal and reflective ink.

The light reflection patterns include one of a metal layer and a reflective ink layer over substantially an entire lower surface of the diffusion plate, and include openings which allow the light to pass therethrough in a unit area. The openings disposed in a center portion of the diffusion plate have relatively large planar areas as compared with the openings disposed in a light incident area adjacent to the light source unit.

In an exemplary embodiment, the lateral light is guided to the display panel by the reflective sheet including the light diffusion pattern and by the plate including prisms at the bottom surface thereof. Advantageously, the display apparatus that does not employ a light guide plate, may reduce the cost caused by the use of a light guide plate, and decrease thickness of the display apparatus.

BRIEF DESCRIPTION OF THE DRAWINGS

The above and other advantages of the present invention will become readily apparent by reference to the following detailed description when considered in conjunction with the accompanying drawings wherein:

FIGS. 7A to 7F are views illustrating exemplary embodiments of a light output from a plate according to an exit angle of the light source unit shown in FIG. 5;

FIG. 11 is a sectional view illustrating an exemplary embodiment of a backlight unit according to the present invention;

DETAILED DESCRIPTION OF THE INVENTION

Figure 1:
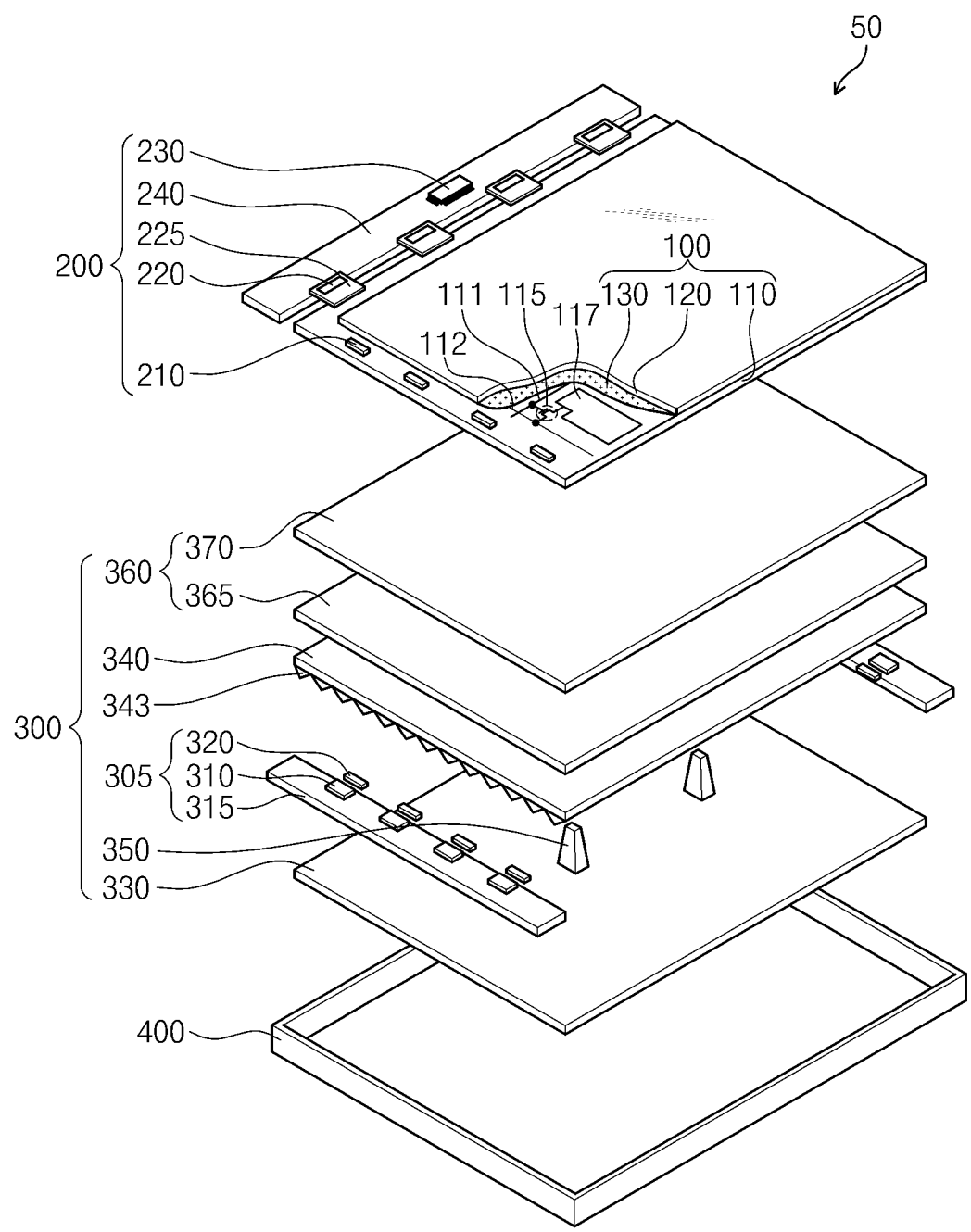
FIG. 1 is an exploded perspective view illustrating an exemplary embodiment of a display apparatus according to the present invention.

Hereinafter, embodiments of a display apparatus will be explained in detail with reference to the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. In addition, the size of layers and regions shown in the drawings can be simplified or magnified for the purpose of clear explanation. Also, the same reference numerals are used to designate the same elements throughout the drawings.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
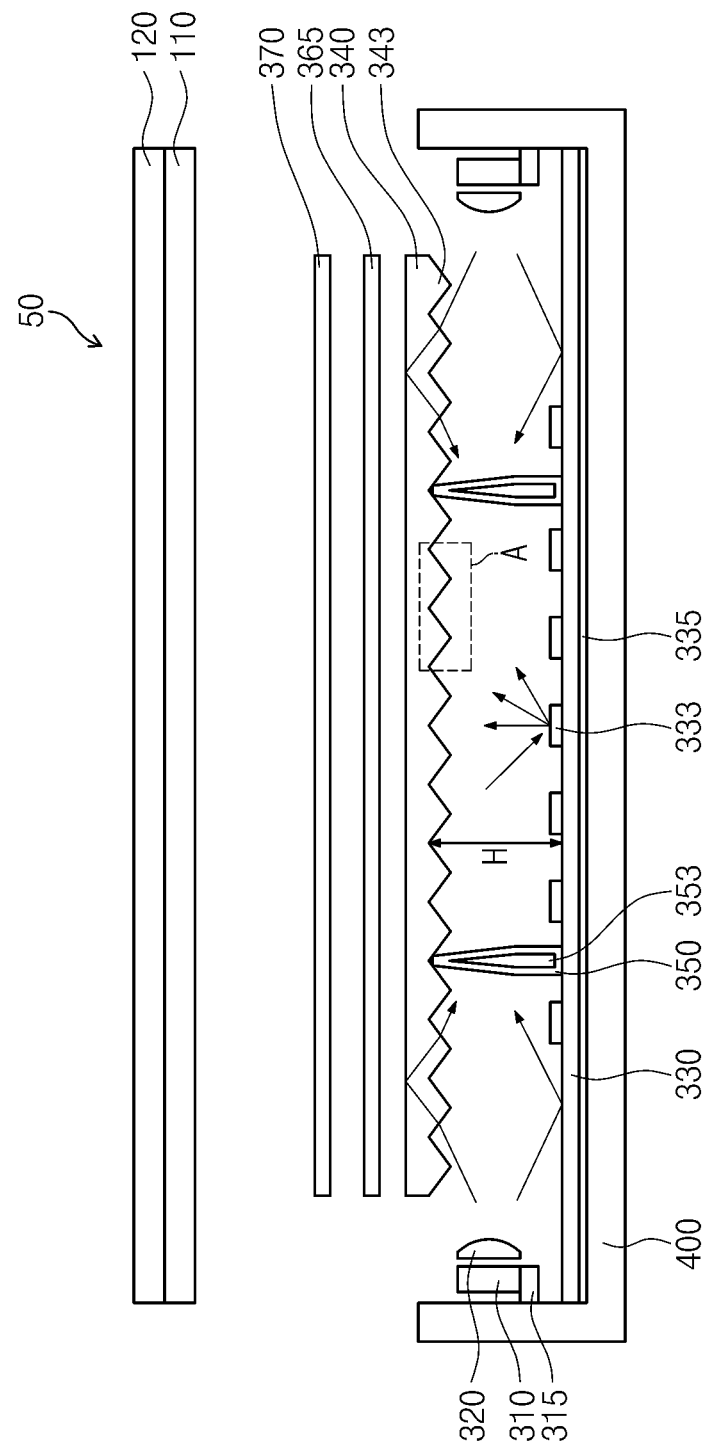
FIG. 2 is a sectional view illustrating the display apparatus shown in FIG. 1.

FIG. 1 is an exploded perspective view illustrating an exemplary embodiment of a display apparatus according to the present invention, and FIG. 2 is a sectional view illustrating the display apparatus shown in FIG. 1.

Referring to FIGS. 1 and 2, the display apparatus 50 includes a display panel 100, a driving circuit 200, a backlight unit 300 and a bottom chassis 400.

The display panel 100 includes a thin film transistor substrate 110, a color filter substrate 120, and a liquid crystal 130 interposed between the thin film transistor substrate 110 and the color filter substrate 120 to adjust a transmittance of light passing through the display panel 100.

The thin film transistor substrate 110 may be a glass or plastic substrate, and includes a plurality of a gate line 111, a plurality of a data line 112, a thin film transistor 115 physically and/or electrically connected with a gate line 111 and a data line 112, and a pixel electrode 117 physically and/or electrically connected with the thin film transistor 115. The gate line 111 extends in a first direction substantially parallel to a longitudinal direction of the display apparatus 50, and the data line 112 extends in a second direction substantially parallel to a transverse direction of the display substrate 50 inclined with respect to the longitudinal direction. The gate line 111 and the data line 112 cross each other. The color filter substrate 120 faces the thin film transistor substrate 110 and includes a color filter (not shown), a black matrix (not shown) and a common electrode (not shown). The liquid crystal 130 is aligned by alignment layers (not shown) of the thin film transistor substrate 110 and the color filter substrate 120, and is driven by an electric field formed by the pixel electrode 117 and the common electrode to adjust the light transmittance.

The driving circuit 200 includes a gate driver 210, a data driver 220, a timing controller 230 and a printed circuit board 240 to provide the display panel 100 with signals.

The gate driver 210 is mounted on one side, such as along a transverse side, of the display panel 100 to provide the gate line 111 with a driving signal. The data driver 220 is mounted on a signal transmission film 225 including a plurality of interconnections, while being electrically connected with the display panel 100 and the printed circuit board 240. The timing controller 230 is mounted on the printed circuit board 240 to provide the gate driver 210 and the data driver 220 with a control signal. The printed circuit board 240 is provided with various electrical devices including the timing controller 230 to provide the display panel 100 with various signals through the signal transmission film 225.

The backlight unit 300 includes a plurality of a light source unit 305, a reflective sheet 330, a plate 340 which both reflects and transmits light and a plurality of optical sheets 360 to provide the display panel 100 with a light. Each of the reflective sheet 330 and the plate 340 are a single, continuous and indivisible unit, respectively.

The light source units 305 are disposed to at least one side, such as the transverse side of the display panel 100, and below (e.g., overlapping) the display panel 100. In FIGS. 1 and 2, the light source units 305 are disposed at two of opposing sides of the display apparatus 50 and both disposed below and overlapping the display panel 100.

Each light source unit 305 includes a plurality of point light sources, such as light emitting diodes, 310 mounted on a light source substrate 315, and generating and emitting a light, and a plurality of a collimator 320 each refracting a light emitted from the light emitting diodes 310.

The light source substrate 315 provides the light emitting diodes 310 with external supply voltage. The light emitting diodes 310 are mounted on the light source substrate 315 at a predetermined interval in the transverse direction of the display apparatus 50, while facing each other at both sides of the display panel 100, with respect to the collimators 320 and the plate 340. In an exemplary embodiment, the light emitting diodes 310 may generate and/or emit a white light. Further, the light emitting diodes 310 may generate and/or emit red R, green G and blue B lights.

The collimators 320 include transparent material and are disposed in front of the light emitting diodes 310, such as in a light emitting direction from the light emitting diodes 310. A collimator 320 is disposed directly adjacent to a light emitting surface of each of the light emitting diodes 310. The collimators 320 may include a form of a hemispherical convex lens, to reduce an exit angle of the light emitted from the light emitting diodes 310.

The collimators 320 may be integrally formed with the light emitting diodes 310. As used herein, "integral" indicates being a single, continuous and indivisible member. In one exemplary embodiment, each of the collimators 320 may include the form of a convex lens which surrounds a single one of the light emitting device (e.g., portion) of the light emitting diodes 310, or which collectively surrounds more than one of the light emitting devices of the light emitting diodes 310. Alternatively, the collimators 320 may include a form of a trapezoid to reduce an exit angle of a light, as well as the convex lens.

In an alternative exemplary embodiment, each of the light source units 305 may include a lamp (not shown) inserted into a lamp housing (not shown), and the collimators 320 disposed in front of the lamp.

The reflective sheet 330 is disposed between the light source units 305, which face each other with respect to the collimators 320, in correspondence with (e.g., overlapping substantially an entire of) the display panel 100. The reflective sheet 330 reflects the light emitted from the light source units 305 towards the display panel 100, and has a substantially planar shape. The reflective sheet 330 may be formed by coating metal material on a base film. In one exemplary embodiment, the reflective sheet 330 may be formed by coating metal material, such as silver (Ag) or aluminum (Al), on the base film, in which mirror reflection occurs on a surface of the metal material. Further, the reflective sheet 330 may include a multilayer thin film structure in which a plurality of materials having refractive indexes different from each other is laminated. In one exemplary embodiment, the reflective sheet 330 may include a multilayer thin film in which a material having a low refractive index, such as an enhanced specular reflector ("ESR") film, and a material having a high refractive index are laminated in turns.

The reflective sheet 330 is disposed directly on a bottom portion of the bottom chassis 400 and may be coupled with the bottom chassis 400. In one exemplary embodiment, the reflective sheet 330 is coupled with the bottom chassis 400 using a coupling member 335, such as an adhesive. The adhesive 335 may be substantially linearly disposed along an outer peripheral portion of the reflective sheet 330, such that the reflective sheet 330 may be coupled with the bottom chassis 400. Alternatively, the adhesive 335 may be disposed on substantially an entire surface of the reflective sheet 330, such that the reflective sheet 330 may be coupled with the bottom chassis 400.

The reflective sheet 330 includes a plurality of a light diffusion pattern 333 disposed on an upper surface thereof, each of which diffusely reflects the light provided from the light source units 305, so that the light may be uniformly reflected toward substantially an entire surface of the display panel 100. A whole of the light diffusion patterns 333 are disposed between the reflective sheet 330 and the plate 340.

If the reflective sheet 330 diffusely reflects the light, which is provided from the light source units 305, in light incident areas adjacent to the light source units 305, the light is emitted toward side surfaces of the display panel 100 corresponding to the light incident areas, so an amount of the light provided to a center area of the display panel 100 may be reduced. However, in the illustrated embodiment, the reflective sheet 330 includes the light diffusion patterns 333 disposed an the upper surface, and having planar areas different from each other according to a distance relative to the light source units 305, in order to uniformly reflect light toward the entire surface of the display panel 100.

In one exemplary embodiment, the light diffusion patterns 333 arranged on substantially the center area of the reflective sheet 330, which corresponds (e.g., aligns with) to the center of the display panel 100, overlap relatively large planar areas, as compared with the light diffusion patterns 333 arranged closer to the light incident areas adjacent to the light source units 305. As shown in FIG. 2, specular reflection occurs in the incident areas where the light diffusion patterns 333 have relatively small planar areas closer to the light incident areas adjacent to the light source units 305, and diffusion reflection occurs in the center area of the reflective sheet 330 where the light diffusion patterns 333 have relatively large planar areas, so that the light may be uniformly distributed toward substantially the entire surface of the display panel 100.

In one exemplary embodiment, the light diffusion patterns 333 may be formed by printing diffusion ink on the top surface of the reflective sheet 330.

The plate 340 is supported by one or a plurality of a supporter 350, and disposed above the reflective sheet 330 while being spaced apart from the reflective sheet 330 by a predetermined distance. A whole of the supporters 350 are disposed between the plate 340 and the reflective sheet 330. A distal end of each of the supporters directly contacts a lower surface of the plate 340, and a base of the each of the supporters directly contacts the top surface of the reflective sheet 330. A supporter 350 may be disposed between adjacent light diffusion patterns 333, in a layout view of the display apparatus 50.

In one exemplary embodiment, the plate 340 is supported by about six supporters 350 to about ten supporters 350, while being spaced apart from the reflective sheet 330 by a light guide height H of about 4 millimeters (mm). The light guide height H between the plate 340 and the reflective sheet 330 may vary depending on an exit angle of the light provided from the light source units 305. The light guide height H increases proportionally to an exit angle of a light. However, the present invention is not limited thereto. The light guide height H is adjusted to achieve slimness of the backlight assembly. The plate 340 guides the light provided from the light source units 305 together with the reflective sheet 330, while interposing air space therebetween.

The plate 340 has predetermined thickness to maintain a substantially plate shape. The thickness is taken in a vertical direction of FIG. 2, which is a third direction substantially orthogonal to both the first and second directions described above. In one exemplary embodiment, the plate 340 has thickness of about 0.7 millimeter (mm) or more, such that bending of the plate 340 toward the reflective sheet 330 is restricted. When the plate 340 has thickness less than about 0.7 mm, a portion of the plate 340, which is not supported by the supporters 350, may be undesirably bent. When the plate 340 has thickness less than about 0.7 mm, if the number of the supporters 350 supporting the plate 340 increases to reducing bending of the portion of the plate 340 not supported by supporters 350, brightness degradation may undesirably occur due to stains caused by shadows of the supporters 350.

The plate 340 includes transparent insulating material to improve light transmittance. In one exemplary embodiment, the plate 340 includes material such as polymethylmethacrylate ("PMMA") or polycarbonate ("PC"), and has a refractive index of about 1.5 to about 1.6.

The plate 340 includes a plurality of a prism 343 disposed on one surface thereof, each facing the reflective sheet 330. The prisms 343 are a continuous and indivisible portion of the plate 340, such that the plate 340 is a single and continuous unit. Each of the prisms 343 longitudinally extends substantially perpendicularly to the light source units 305 and substantially parallel to each other, to guide the light provided from the light source units 305. FIG. 2 shows the prisms 343 extending in parallel to the light source units 305 for the purpose of convenience. However, the present invention is not limited thereto. The prisms 343 are arranged with a pitch of about 50 micrometers (μm) to about 300 micrometers (μm) to reduce or effectively prevent moiré phenomenon.

Distal ends of the prisms 343 face the top surface of the reflective sheet 350, while a base of the prisms 343 are substantially coplanar across the plate 340. The distal end of each of the supporters 350 may be disposed at an area between adjacent prisms 343.

The plate 340 selectively reflects and outputs the lights through the prisms 343 according to incident angles of the lights provided from the light source units 305 and the reflective sheet 330. In the illustrated embodiment, the plate 340 refracts the light provided from the light source units 305 by using the prisms 343. The light from the light source units 305 is first refracted by the prisms 343 and then second refracted while being output from the plate 340, when the light travels from an inside to an outside of the diffusing plate, as shown in FIG. 2. When the light refracted by the prisms 343 is incident into a boundary surface between the inside and the outside of the plate 340 at an angle smaller than a critical angle at which total reflection occurs, the light is reflected to the inside of the plate 340. Further, when the light refracted by the prisms 343 is incident into the boundary surface at an angle larger than the critical angle, the light is output to the outside of the plate 340 by passing through the plate 340.

The plate 340 may reflect about 70% or more of the light through the prisms 343. When the plate 340 reflects about 70% or less of the light, guide characteristic of the plate 340 for the light may not be degraded. Since light reflection is greater than light transmission in the plate 340, the light is uniformly distributed toward the display panel 100.

Each supporter 350 is interposed between the reflective sheet 330 and the plate 340 to support the plate 340. Each supporter 350 includes a bottom surface (e.g., the base) having a relatively wide contact surface, and a top surface (e.g., at the distal end) having a relatively narrow contact surface to contact and support the plate 340. The top surface of the supporter 350 makes direct contact with the prisms 343 of the plate 340. The bottom surface of the supporter 350 has a width of about 3 mm or less, and makes direct contact with the reflective sheet 330.

Each supporter 350 includes an open area (e.g., a hole) 353, where a material of the supporter is not disposed. The supporter 350 may be considered "hollow" with the open area 353 disposed therein. The open area 353 may pass completely through a body of the supporter 350 perpendicularly to a longitudinal direction of the supporter 350, so that transmittance of the light emitted from the light source units 305 can be improved.

The optical sheet 360 includes a diffusion sheet 365 and a prism sheet 370 disposed on the plate 340 to diffuse and collect the light passing through the plate 340. The diffusion sheet 365 is disposed directly on the plate 340 to diffuse the light passing through the plate 340 such that the light is substantially uniformly incident into the display panel 100. The prism sheet 370 is disposed directly on the diffusion sheet 365 to collect the light passing through the diffusion sheet 365, such that the light is substantially vertically incident into the display panel 100.

In the backlight unit 300, the configuration of the optical sheet 360 may vary depending on characteristics of the display apparatus 50. In one exemplary embodiment, the optical sheet 360 may further include a reflective polarizing sheet (not shown), which is disposed on the prism sheet 370, and between the prism sheet 370 and the display panel 100, to reflect and polarize the light passing through the prism sheet 370, and a protective sheet (not shown) which protects the prism sheet 370 or the reflective polarizing sheet from an external impact.

The backlight unit 300 guides the light emitted from the light source units 305 disposed at an edge of the backlight unit, to the reflective sheet 330 in which mirror reflection occurs, and through the prisms 343 in which substantially total reflection occurs, and allows the light uniformly distributed by the light diffusion patterns 333 to pass through the plate 340, so that the light is provided to the display panel 100. Advantageously, the backlight unit 300 may guide the lateral light without using a light guide plate, thereby providing the light to the display panel 100. Since the plate 340 both reflects and transmits light such that a separate light guide plate is not required, and an overall thickness of the display apparatus 50 may be minimized.

The bottom chassis 400 receives the backlight unit 300 therein to reduce or prevent the backlight unit 300 from an external impact. The bottom chassis 400 receives the backlight unit 300 to define an area, in which the light is guided (e.g., reflected and transmitted), without using a light guide plate. In the illustrated embodiment, the bottom chassis 400 includes a light guide area such that the light emitted from the light source units 305 is guided in the reflective sheet 330, the plate 340 and the bottom chassis 400.

The bottom chassis 400 may include a bottom portion and a plurality of a sidewall portion extending from the bottom portion in the third direction towards the display panel 100. The bottom portion and the sidewall portions of the bottom chassis 400 define a receiving space therebetween, and define a light guide area where the light emitted from the light source units 305 is guided. The light guide area may be collectively defined by the receiving space of the bottom chassis 400 and an area occupied by the plate 340, such as limited by an upper surface of the plate 340 where light exits from the reflective and transmissive plate 340.

Figure 3:
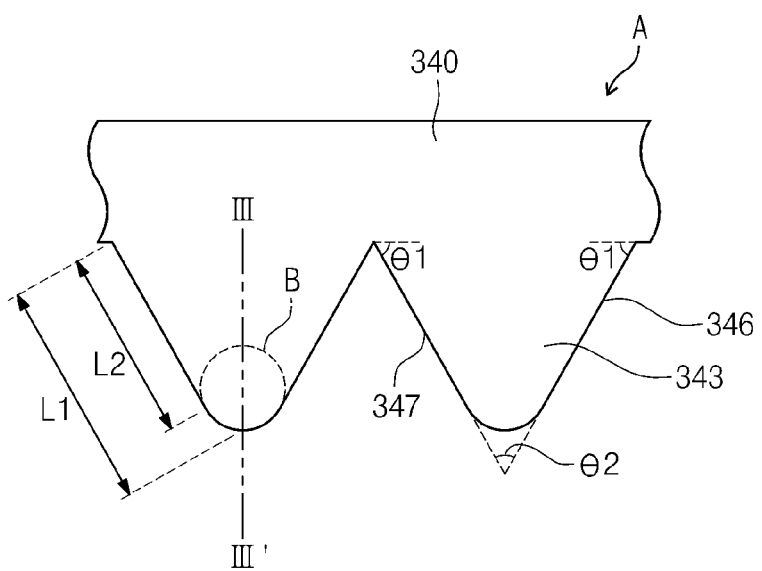
FIG. 3 is an enlarged sectional view illustrating part A shown in FIG. 2.

FIG. 3 is an enlarged sectional view illustrating part A shown in FIG. 2.

Referring to FIG. 3, the plate 340 includes the prisms 343 disposed on a bottom surface thereof, each extending outward in the third direction towards the bottom chassis 400. In each prism 343, a vertex is formed between a first side 346 and a second side 347, and may be rounded. The first side 346 and the second side 347 correspond to side surfaces of the prism 343. In each prism 343, the first side 346 and the second side 347 are inclined with respect to an extension line of a top surface of the plate 340 (e.g., light emitting surface) at a first angle θ1, respectively. In one exemplary embodiment, when each of the first side 346 and the second side 347 is inclined at an angle of about 45°, the light provided from the light source units 305 can be substantially totally reflected. Thus, when the vertex formed between the first side 346 and the second side 347 has an angle θ2 of about 90°, substantial total reflection advantageously occurs in the plate 340.

Each of the first side 346 and the second side 347 includes a substantially linear section configured to have a length at a predetermined ratio with respect to an entire length of the first and the second side. The entire length corresponds to a first length L1 between a first end of the first side 346 or the second side 347, which is inclined with respect to the top surface of the plate 340, and a second end of the first side 346 or the second side 347 at the vertex of the prism 343. The first end first side 346 or the second side 347 may be defined at the base of the prisms 343, or where the bases of the prisms 343 are substantially coplanar with each other across the plate 340.

For example, the first length L1 corresponds to the distance between the first end of the first side 346 or the second side 347 and a predetermined point of a reference line III-III' that meets the vertex of the prism 343. The linear section of the first side 346 and the second side 347 corresponds to a second length L2 between the first end of the first side 346 or the second side 347, and a point from which the first side 346 or the second side 347 is curved. The second length L2 corresponds to the distance between the first end of the first side 346 or the second side 347, and a part at which the second end of the first side 346 or the second side 347 makes contact with a virtual circle B corresponding to the rounded vertex.

In an exemplary embodiment, the second length L2 may be configured at a ratio of about 80% or more, with respect to the first length L1. In the prisms 343, when the linear section of the first side 346 or the second side 347 is formed at a ratio of about 80% or more with respect to the entire length, the substantially total reflection due to refraction advantageously occurs.

Figure 4:
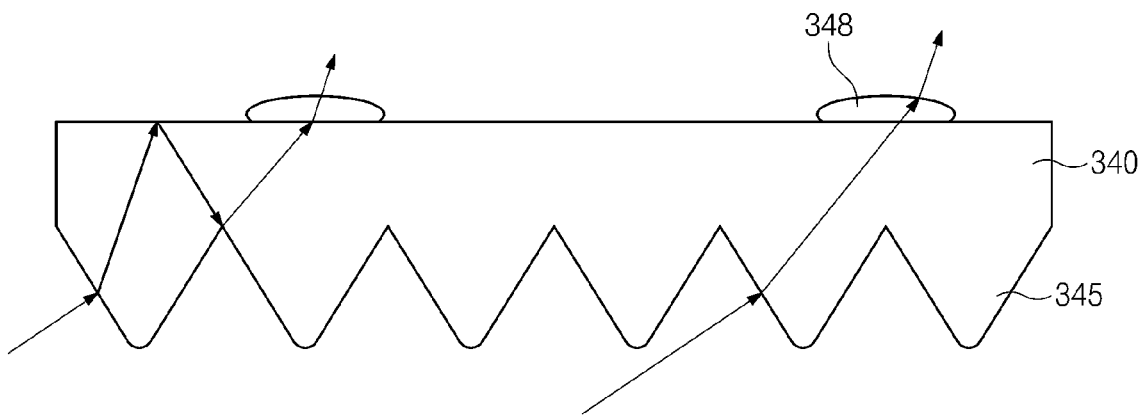
FIG. 4 is a sectional view illustrating an exemplary embodiment of a plate according to another embodiment of the present invention.

FIG. 4 is a sectional view illustrating another exemplary embodiment of the plate 340 according to the present invention.

Referring to FIG. 4, the plate 340 includes a plurality of a prism 345 disposed on a lower (light incident) surface thereof, and a plurality of a light transmissive pattern 348 disposed on an upper (light exiting) surface thereof. Since the prisms 345 are substantially identical to the prisms 343 of FIG. 3, further detailed description thereof will be omitted.

The light transmissive patterns 348 include material having a refractive index similar to that of a material of a remainder of the plate 340 to facilitate transmittance of a light incident into the plate 340, and include curved surfaces making contact with an air space outside of the plate 340. The light transmissive patterns 348 reduce the difference between the refractive index of the plate 340 and the refractive index of the air space, and reduces total reflection of a light through the curved surfaces thereof. The light transmissive patterns 348 improve transmittance of a light, which is totally reflected in the plate 340 and does not pass through the plate 340.

In a layout view of the plate 340, the light transmissive patterns 348 may be more densely disposed at a center portion of the plate 340 in comparison to a peripheral (edge) part of the plate 340, such that the center portion of the plate 340 can transmit greater quantity of the light provided from the light source units 305 disposed at opposing sides of the plate 340.

The light transmissive patterns 348 may include transparent ink such that the light relatively easily passes through the light transmissive patterns 348. In exemplary embodiments, the light transmissive patterns 348 may include ink, which has one of polyvinyl chloride ("PVC") and acryl resin, and diffuser mixed with the ink. In one exemplary embodiment, the diffuser may be particles including silicon oxide ($SiO_2$) and titanium oxide ($TiO_2$).

As described above, the light transmissive patterns 348 are disposed on the upper (light exiting) surface of the plate 340 to substantially freely adjust transmittance of the light, which is incident into the plate 340, at a specific position of the plate 340.

Figure 5:
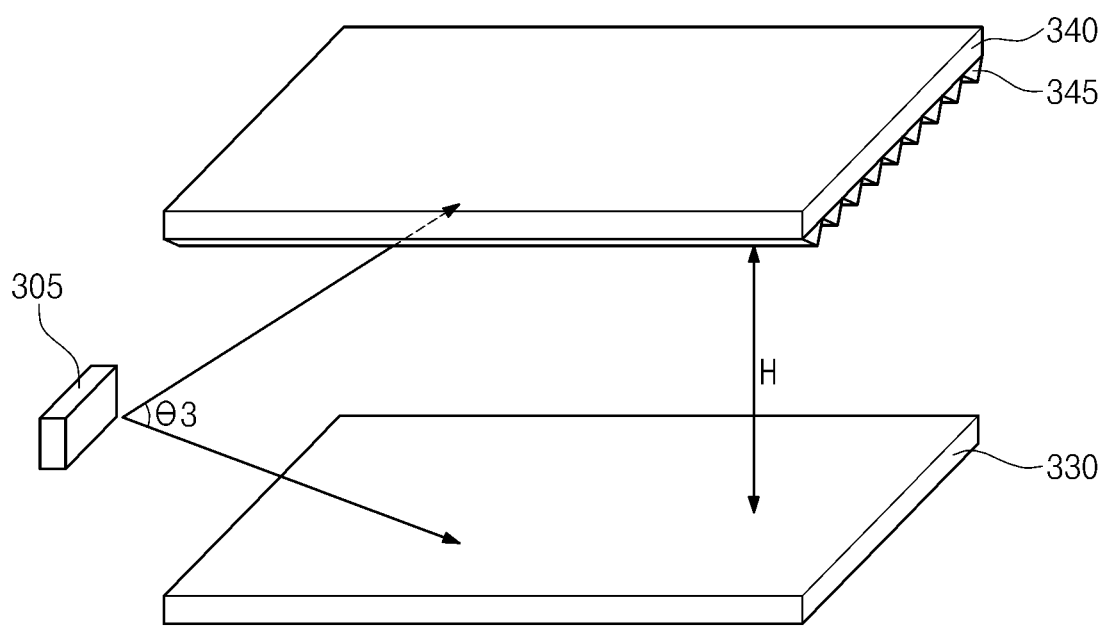
FIG. 5 is a perspective view illustrating exemplary embodiment of a light source unit according to the present invention.
Figure 6A:
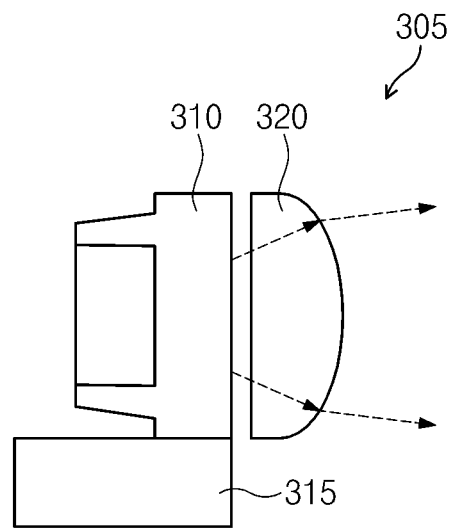
FIGS. 6A and 6B are sectional views illustrating the light source unit shown in FIG. 5.
Figure 6B:
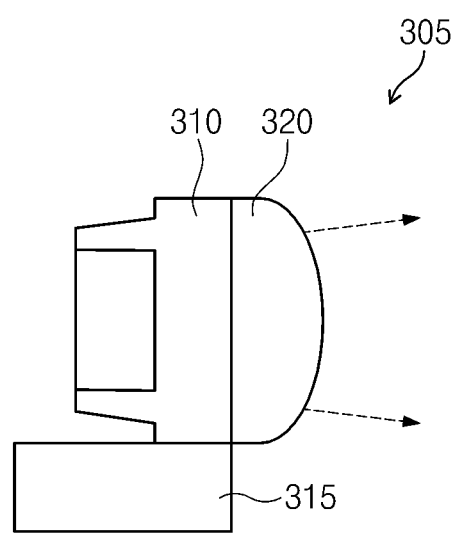

FIG. 5 is a perspective view illustrating the light source unit according to one embodiment of the present invention, and FIGS. 6A and 6B are sectional views illustrating the light source unit shown in FIG. 5.

Referring to FIGS. 5, 6A and 6B, the light source unit 305 is located at one side of both the plate 340 and reflective sheet 330. The light source unit 305 is disposed between the plate 340 and the reflective sheet 330 in the third direction, to provide the plate 340 and the reflective sheet 330 with a light. A portion or an entire of the light source unit 305 may overlap a portion of the plate 340 and/or the reflective sheet 330. The light source unit 305 includes the light emitting diode ("LED") 310 mounted on the light source substrate 315, and the collimator 320 which refracts a light emitted from the LED 310 (FIGS. 1 and 2).

In an exemplary embodiment, the LED 310 generates a white light to emit the white light toward both the plate 340 and the reflective sheet 330. The LED 310 outputs the light from an exit surface, on which a light emitting device exists, at a predetermined angle. In one exemplary, the LED 310 emits the light at an angle of about 120° longitudinally and transversely.

The light source unit 305 preferably provides the plate 340 with a light in a range of a critical angle such that about 70% or more of the light incident into the plate 340 is reflected by the plate 340. The light source unit 305 uses the collimator 320 to control a light exit angle θ3 by refracting the light emitted from the LED 310.

As shown in FIG. 6A, the collimator 320 may be disposed in front of the LED 310 emitting the light, such as facing the exit surface of the LED 310. The collimator 320 is configured substantially in the shape of a convex lens and refracts the light emitted from the LED 310, such that the light has the exit angle θ3 smaller than about 10° to about 60°. In the illustrated embodiment, the collimator 320 is disposed at a focal distance corresponding to the exit angle θ3 of about 10° to about 60°.

Meanwhile, as shown in FIG. 6B, the collimator 320 may be integrally formed with the LED 310, such as to collective form a single, continuous and indivisible unit. In an alternative embodiment, the collimator 320 may be configured substantially in the shape of a lens surrounding the light emitting device of the LED 310. The collimator 320 may surround the LED 310 on all sides of the LED 310, or may overlap all of the light exiting surfaces of the LED 310.

Hereinafter, light guide performance of the plate 340 according to the exit angle θ3 of the light source unit 305 will be described with reference to FIGS. 7A to 7F.

FIGS. 7A to 7F are views illustrating exemplary embodiments of a light output from the plate according to the exit angle of the light source unit shown in FIG. 5. FIGS. 7A to 7F show the light output from the plate 340 after the light source unit 305, which includes the collimator 320 and located at one side between the plate 340 and the reflective sheet 330, emits the light at various angles in a state in which the light guide height H of about 4 mm is disposed between the plate 340 and the reflective sheet 330. In FIGS. 7A to 7F, the emitted light is expressed by a relatively bright part.

Figure 7A:
Figure 7B:

Referring to FIGS. 7A to 7C, if the light is emitted from the light source unit 305 at angles of about 120°, about 90° and about 70°, the light is substantially output from the plate 340 around the light incident area adjacent to the light source unit 305. A lower portion of each of the FIGS. 7A-7C includes a relative bright part indicating where light is emitted.

Figure 7E:
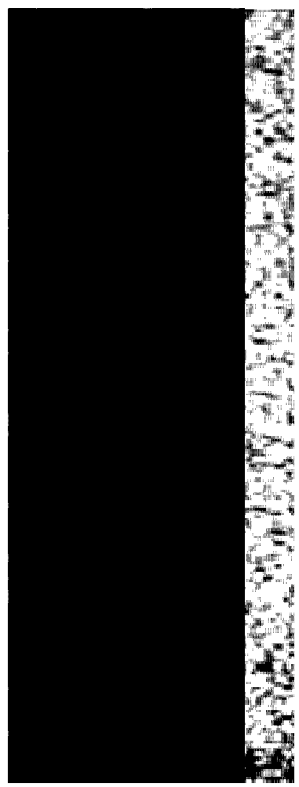
Figure 7F:
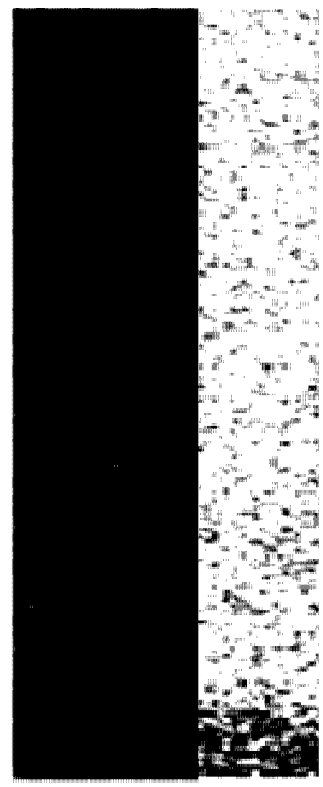

Referring to FIGS. 7D to 7F, if the light is emitted from the light source unit 305 at an angle of about 60° or less, the light is substantially uniformly output from the entire surface of the plate 340, and not concentrated at the light incident area adjacent to the light source unit 305 as shown in FIGS. 7A-7C. If the light is emitted from the light source unit 305 at an angle of about 60° or less, the number of reflections of the light from an upper side to the lower side of the plate 340 is reduced, so that the light is substantially uniformly distributed over the entire surface of the plate 340.

Hereinafter, the light guide performance of the plate 340 according to the distance between the reflective sheet 330 and the plate 340 will be described with reference to FIGS. 8A to 8C.

Figure 8A:
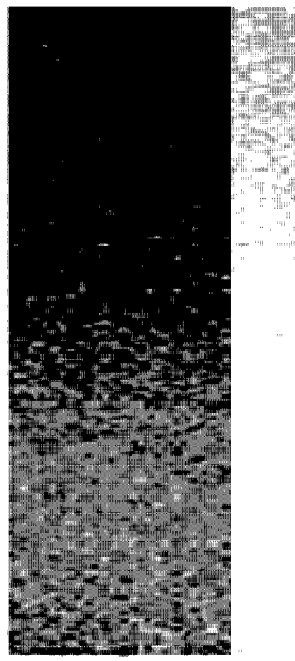
FIGS. 8A to 8C are views illustrating exemplary embodiments of a light output from a plate according to a distance between a reflective sheet and a plate shown in FIG. 5.
Figure 8B:
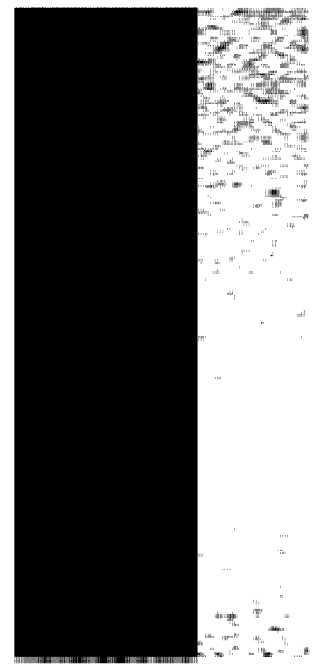
Figure 8C:

FIGS. 8A to 8C are views illustrating exemplary embodiments of a light output from the plate according to the distance between the reflective sheet and the plate shown in FIG. 5. FIGS. 8A to 8C show the light output from the plate 340 after the light source unit 305 located at one side between the reflective sheet 330 and the plate 340 emits the light at the exit angle θ3 of about 60°. In FIGS. 8A to 8C, the emitted light is expressed by a relatively bright part.

Referring to FIG. 8A, if the distance between the reflective sheet 330 and the plate 340 is about 2 mm, the light output from the plate 340 around the light incident area adjacent to the light source unit 305 is brighter than the light output at other areas of the plate 340, such as at a center. Thus, brightness variation undesirably occurs in the light output from the plate 340.

Referring to FIG. 8B, if the distance between the reflective sheet 330 and the plate 340 is about 3 mm, the light is not uniformly distributed over the entire surface of the plate 340. Thus, brightness variation undesirably occurs in the light output from the plate 340.

Referring to FIG. 8C, if the distance between the reflective sheet 330 and the plate 340 is about 4 mm, the light is uniformly distributed over the entire surface of the plate 340, so that brightness is uniformly distributed. When the distance between the reflective sheet 330 and the plate 340 is about 4 mm, the number of reflections of the light is reduced, so that the light is uniformly distributed over the entire surface of the plate 340.

In exemplary embodiments, the distance between the reflective sheet 330 and the plate 340 may vary depending on an exit angle of the light provided from the light source unit 305. As the distance between the reflective sheet 330 and the plate 340 is smaller, the number of reflections of the light in the plate 340 can be adjusted by reducing the exit angle of the light. In the illustrated embodiment the distance between the reflective sheet 330 and the plate 340 is preferably about 4 mm or more.

Figure 9:
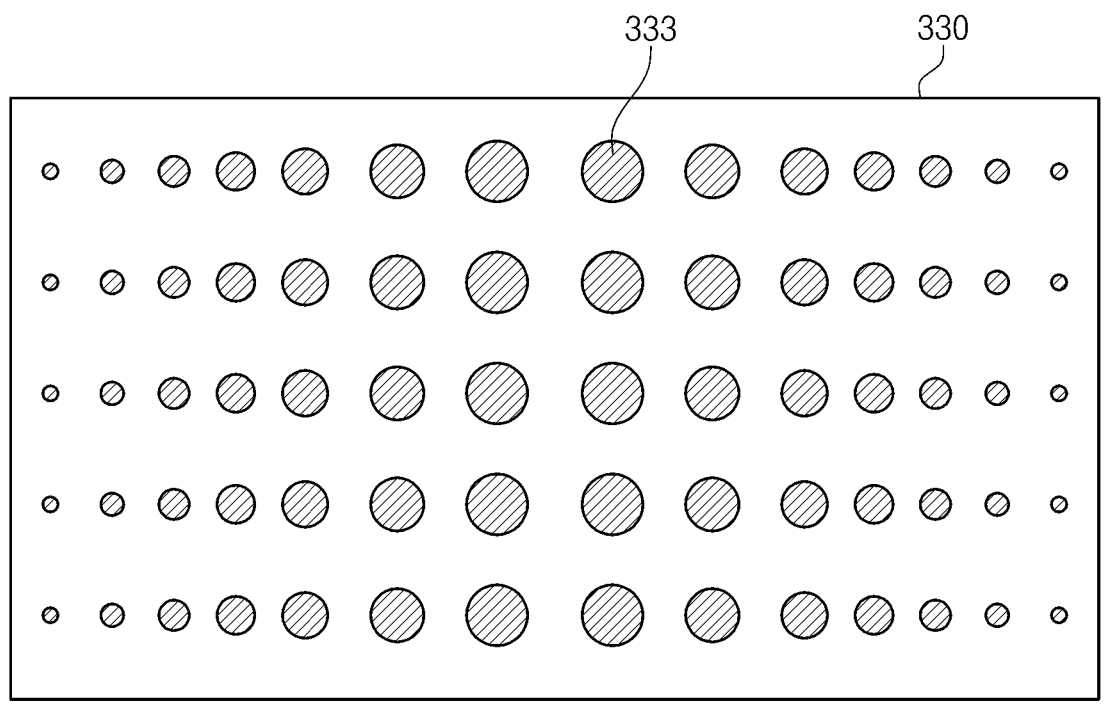
FIG. 9 is a plan view illustrating an exemplary embodiment of the reflective sheet shown in FIG. 2.

FIG. 9 is a plan view illustrating an exemplary embodiment of the reflective sheet shown in FIG. 2.

Referring to FIG. 9, the reflective sheet 330 includes on the upper surface thereof, the light diffusion patterns 333 having a predetermined shape, in the plan view.

The reflective sheet 330 may be formed by coating metal such as silver (Ag) or aluminum (Al), on the base film, or may include a multilayer structure in which materials having refractive indexes different from each other are laminated on the base film in turns. In the reflective sheet 330, an external incident light is specularly reflected.

The light diffusion patterns 333 diffusely reflect the light emitted from the light source units disposed at both of opposing sides of the reflective sheet 330. The light diffusion patterns 333 arranged on the reflective sheet 330 have planar areas different from each other according to the distance relative to the light source unit 305. Each light diffusion pattern 333 has one of circular, oval and polygonal shapes.

Referring to the plan view of FIG. 9, a lamp source unit 305 may be disposed adjacent to each transverse edge of the reflective sheet 330. The light diffusion patterns 333 arranged on both sides of the reflective sheet 330 respectively adjacent to the light source units, have relatively small planar areas In contrast, the light diffusion patterns 333 arranged on the center portion of the reflective sheet 330, further from the light source units 305, have relatively large planar areas in comparison to the light diffusion patterns 333 arranged on both sides of the reflective sheet 330 respectively adjacent to the light source units. In a direction from the transverse side edge to the center of the reflective sheet 330, a planar area of the light diffusion patterns 333 increases.

Each of the light diffusion patterns 333 is a continuous and discrete unit, separated from an adjacent light diffusion pattern 333. A group of light diffusion patterns 333 may be aligned substantially linearly along the first or second direction, or in a direction inclined with respect to the first or second direction. A plurality of the group of the light diffusion patterns 333 may be disposed in a longitudinal or in a transverse direction of the reflective sheet 330.

In one exemplary embodiment, the light diffusion patterns 333 may be arranged with a pitch of about 2 mm or less in the longitudinal direction, respectively. In the plan view, the light diffusion patterns 333 may have a substantially circular shape having a diameter of about 2 mm or less. The reflective sheet 330 specularly reflect the light provided from the light source units at the opposing sides thereof, where the light diffusion patterns 333 have the relatively small planar areas, and diffusely reflect the light at the center portion thereof where the light diffusion patterns 333 have the relatively large planar areas. Advantageously, the reflective sheet 330 can reflect the light provided from the light source units such that the light can be uniformly distributed.

Figure 10A:
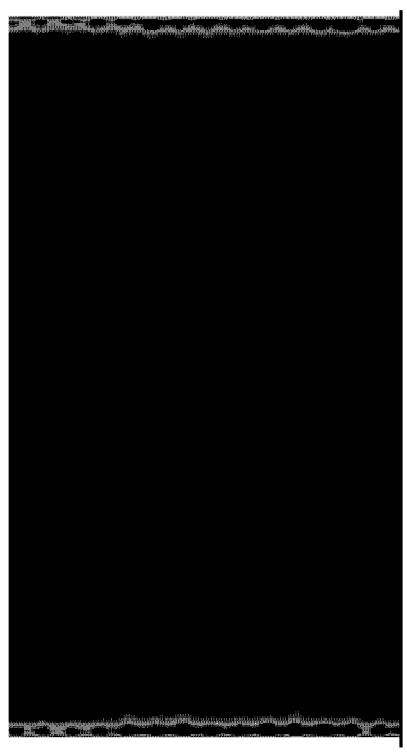
FIG. 10A is a view illustrating an exemplary embodiment of brightness of a light reflected by a reflective sheet shown in FIG. 9, by using a color according to the present invention.
Figure 10B:
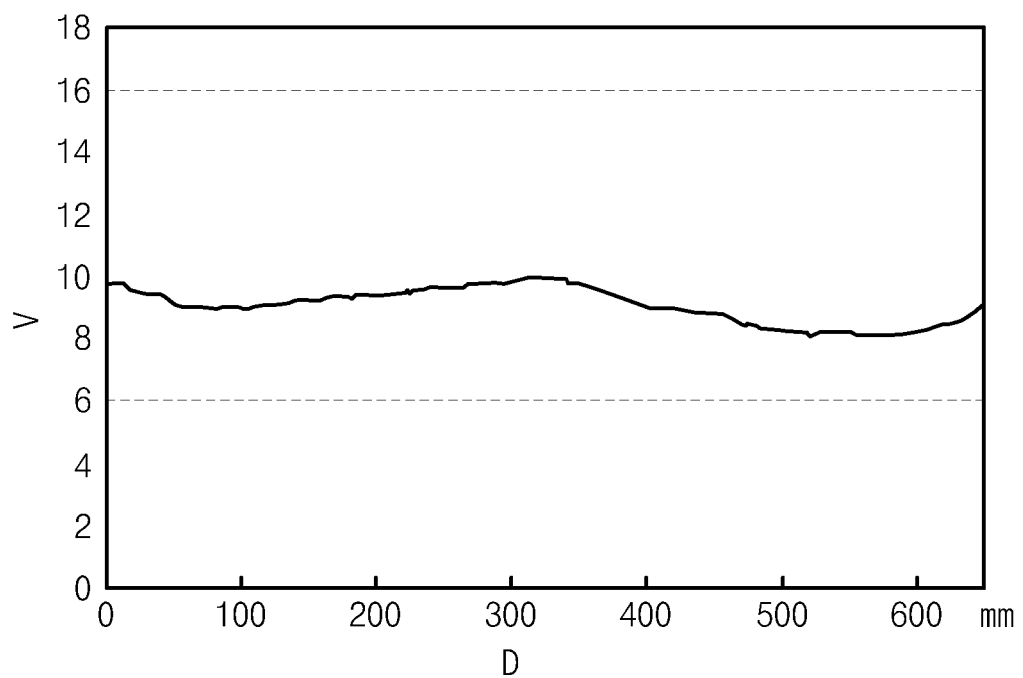
FIG. 10B is a graph numerically illustrating brightness measured along indication line I-I' shown in FIG. 10A.
Figure 10C:
FIG. 10C is a view illustrating another exemplary embodiment of brightness of a light reflected by a reflective sheet shown in FIG. 9, by using a color according to the present invention.
Figure 10D:
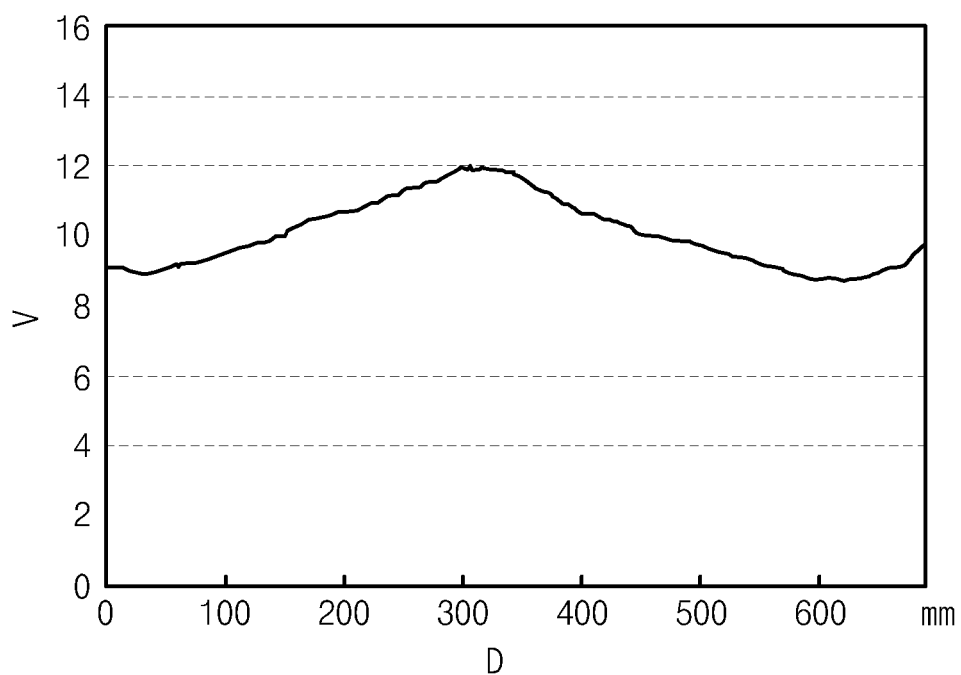
FIG. 10D is a graph numerically illustrating brightness measured along indication line II-II' shown in FIG. 10C.

FIG. 10A is a view illustrating an exemplary embodiment of brightness of a light reflected by the reflective sheet shown in FIG. 9 by using a color according to the present invention, and FIG. 10B is a graph numerically illustrating brightness measured along an indication line I-I' shown in FIG. 10A. FIG. 10C is a view illustrating another exemplary embodiment of brightness of a light reflected by the reflective sheet shown in FIG. 9 by using a color according to the present invention, and FIG. 10D is a graph numerically illustrating brightness measured along an indication line II-II' shown in FIG. 10C. FIGS. 10A and 10C show brightness distribution when measuring a light reflected by the reflective sheet having an area of about 40 inches by using an external appearance measurement device. In FIGS. 10A and 10C, relatively bright parts of upper and lower portions represent a plurality of light sources.

FIGS. 10A and 10C show brightness distribution of the light reflected by the reflective sheet when the light sources provide the light at both sides of the reflective sheet provided with the light diffusion patterns as shown in FIG. 9. In detail, FIG. 10A shows brightness of the light reflected by the reflective sheet provided with the light diffusion patterns as first patterns, and FIG. 10C shows brightness of the light reflected by the reflective sheet provided with the light diffusion patterns as second patterns.

When the reflective sheet includes an light incident area directly adjacent to the light sources, and a center area spaced apart from the light sources, the first patterns (FIG. 10A) have characteristics in which the light diffusion patterns arranged in the light incident area have relatively large planar areas and the light diffusion patterns arranged in the center area have relatively small planar areas, as compared with the second patterns (FIG. 10C). The light diffusion patterns arranged as the first patterns (FIG. 10A) represent a relatively small planar area difference between areas of the light diffusion patterns in the light incident area and the center area, and the light diffusion patterns arranged as the second patterns (FIG. 10C) represent a relatively large planar area difference between areas of the light diffusion patterns in the light incident area and the center area. The light diffusion patterns arranged as the second patterns (FIG. 10C) have relatively large planar areas in the center area, as compared with the light diffusion patterns arranged as the first patterns.

FIGS. 10A and 10C show that the brightness of the light reflected by the reflective sheet may vary in each part of the reflective sheet according to density of the light diffusion patterns. FIGS. 10B and 10D show location-based brightness according to the first and second patterns of FIGS. 10A and 10C, respectively.

FIG. 10B shows brightness measured along an indication line I-I' in the reflective sheet provided with the light diffusion patterns arranged as the first patterns, and FIG. 10D shows brightness measured along an indication line II-II' in the reflective sheet provided with the light diffusion patterns arranged as the second patterns. In FIG. 10B, a horizontal axis D represents the length (mm) of the indication line I-I' shown in FIG. 1A. In FIG. 10D, a horizontal axis D represents the length (mm) of the indication line II-II' shown in FIG. 1C. In FIGS. 10B and 10D, a vertical axis V represents a measurement value of the light reflected by the reflective sheet. The V is expressed by a natural number and proportional to brightness. Relatively, brightness of a light having a measurement value of about 10 may be five times as high as brightness of a light having a measurement value of about 2. The V may also be replaced with brightness unit.

The light reflected by the reflective sheet provided with the light diffusion patterns arranged as the first patterns have measurement values of about 8 to about 10 as shown in FIG. 10B. The light reflected by the reflective sheet provided with the light diffusion patterns arranged as the second patterns have measurement values of about 9 to about 12 as shown in FIG. 10D.

Referring to FIGS. 10B and 10D in association with FIGS. 10A and 10C, the reflective sheet can partially control the brightness of the reflected light by adjusting an arrangement area of the light diffusion patterns. In the graphical illustrations, in the reflective sheet provided with the light diffusion patterns arranged as the first patterns, the light is reflected with brightness having a relatively low variation over an entire area as shown in FIGS. 10A and 10B. In contrast, in the reflective sheet provided with the light diffusion patterns arranged as the second patterns, the light is reflected with high brightness in the center area as shown in FIGS. 10C and 10D, while at lower and upper ends of the figure, the brightness is shown lower than that of the brightness in the center. The two reflective sheets may be used to represent brightness distribution suitable for a backlight unit and a liquid crystal display.

FIG. 11 is a sectional view illustrating another exemplary embodiment of a backlight unit according to the present invention.

Referring to FIG. 11, the backlight unit 300 includes a plurality of the light source unit 305, a reflective sheet 330, a plate 340, a diffusion sheet 365, a prism sheet 370 and a bottom chassis 400. The elements identical to those of FIG. 2 will be briefly described or description thereof will be omitted.

An entire of the reflective sheet 330 is disposed in the bottom chassis 400 and coupled with the bottom chassis 400, such as by using an adhesive 335. The reflective sheet 330 includes a protrusion 390 protruding toward the plate 340, such that greater quantity of light provided from the light source units 305 passes through the center portion of the plate 340. The protrusion 390 protrudes together with the reflective sheet 330 and the bottom chassis 400.

A rear surface of the bottom chassis 400 may define a lowermost plane of the backlight unit 300. The protrusion 390 extends from the lowermost plane of the backlight unit 300 in the third direction, to an inner area of the light guide area. A distal end of the protrusion 390 of the reflective sheet 330 is disposed at a distance from the lowermost plane of the backlight unit 300.

A profile of the protrusion 390 of the reflective plate 330 is substantially parallel to portions of the bottom chassis 400 forming a bottom chassis protrusion extending from the lowermost plane of the backlight unit 300 in the third direction, to an inner area of the light guide area. A distal end of the protrusion of the bottom chassis 400 is disposed at a distance from the lowermost plane of the backlight unit 300.

The protrusion 390 has a height in the third direction smaller than a half of the distance between the reflective sheet 330 and the plate 340. In the illustrated embodiment, the protrusion 390 has a height smaller than a half of a light guide height H between the reflective sheet 330 and the plate 340. The protrusion 390 is inclined with respect to the reflective sheet 330, and the lowermost plane of the backlight unit 300, at a predetermined angle. In one exemplary embodiment, a point at which the protrusion 390 is inclined may correspond to about ⅛ to about ⅜ of the length of the backlight unit 300, and the protrusion 390 has an inclination angle of about 1.4° to about 3.5° with respect to the reflective sheet 330. Advantageously, the reflective sheet 330 shifts a direction of a light horizontally traveled from the light source units 305 such that the light is reflected toward the plate 340 as indicated by the arrows in FIG. 11, so that light loss can be reduced.

The reflective sheet 330 may be provided on the upper surface thereof with a plurality of light diffusion patterns (not shown) that diffusely reflect the light provided from the light source units 305.

Figure 12:
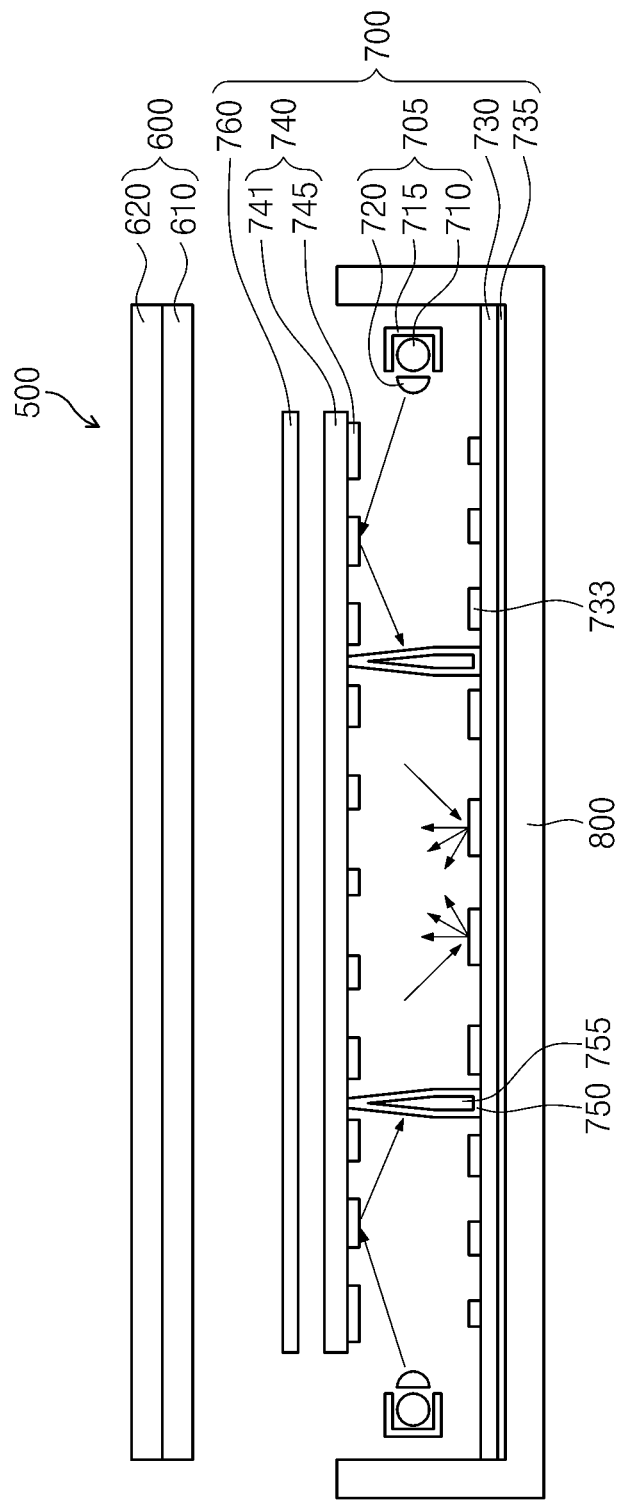
FIG. 12 is a sectional view illustrating another exemplary embodiment of a display apparatus according to the present invention.
Figure 13:
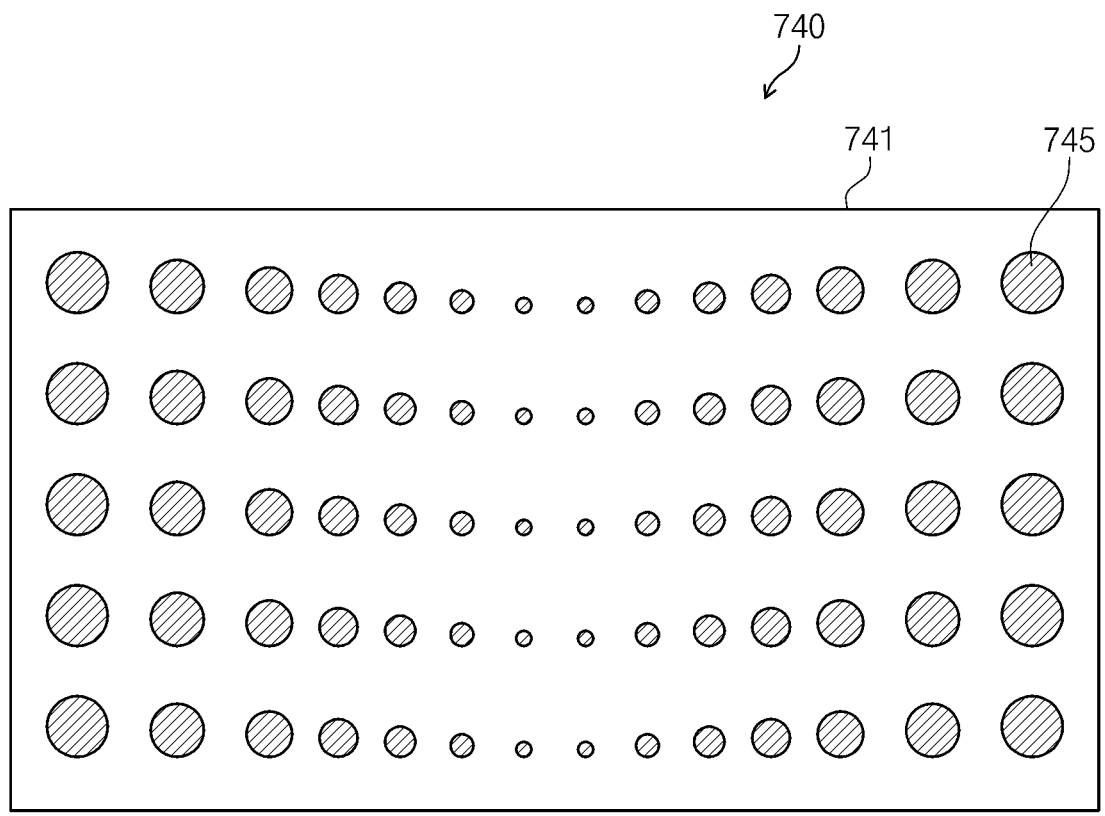
FIG. 13 is a plan view illustrating an exemplary embodiment of the diffusion plate shown in FIG. 12 according to the present invention.
Figure 14:
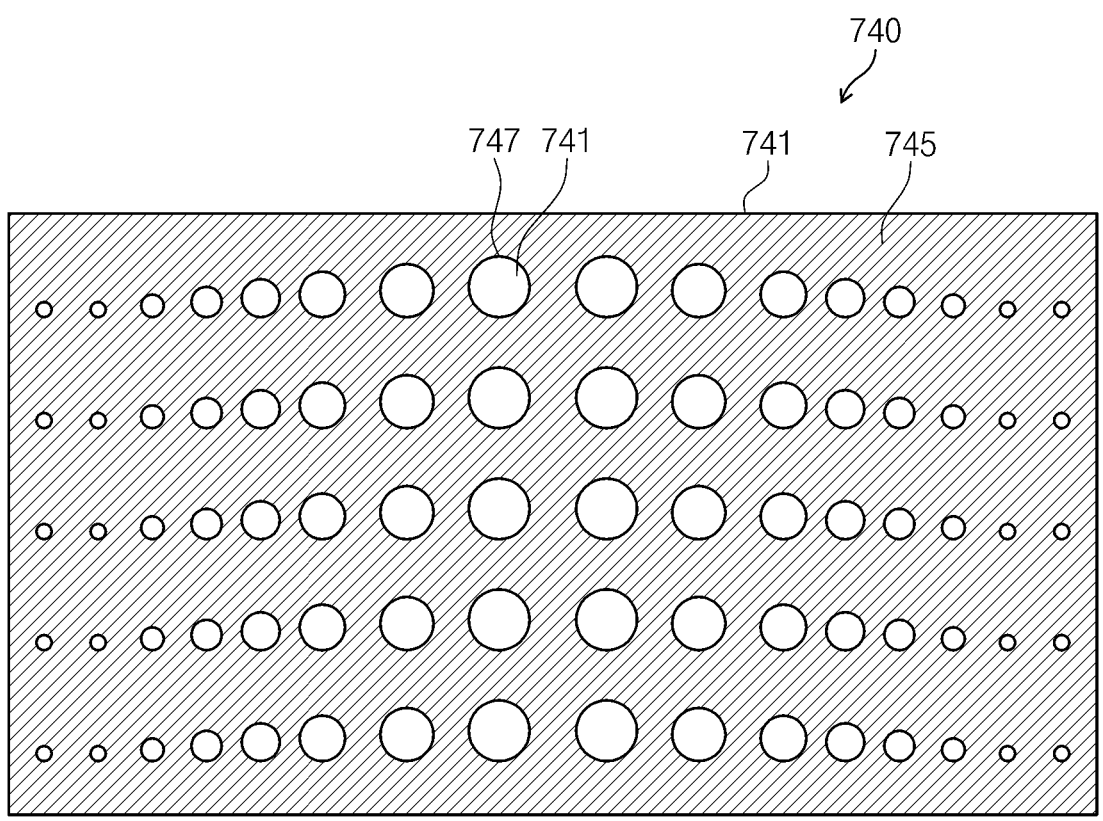
FIG. 14 is a plan view illustrating another exemplary embodiment of the diffusion plate shown in FIG. 12 according to the present invention.

FIG. 12 is a sectional view illustrating another exemplary embodiment of a display apparatus according to the present invention, FIG. 13 is a plan view illustrating an exemplary embodiment of the diffusion plate shown in FIG. 12 according to the present invention, and FIG. 14 is a plan view illustrating another exemplary embodiment of the diffusion plate shown in FIG. 12 according to the present invention.

Referring to FIGS. 12 to 14, the display apparatus 500 includes a display panel 600, a driving circuit (not shown), a backlight unit 700, and a bottom chassis 800. The elements identical to those of FIG. 2 will be briefly described or detailed description thereof will be omitted.

The display panel 600 includes a thin film transistor substrate 610 and a color filter substrate 620 disposed facing each other while interposing liquid crystal (not shown), which adjusts light transmittance, therebetween.

The backlight unit 700 includes a plurality of a light source unit 705 disposed at opposing sides of the display apparatus 500, a reflective sheet 730, a diffusion plate 740, and an optical sheet 760 to provide the display panel 600 with a light.

The light source units 705 are disposed to at least one side below the display panel 600. As illustrated in FIG. 12, the light source units 705 may be disposed at transverse sides of the display apparatus 500. Each light source unit 705 includes a lamp 710 generating a light, a lamp housing 715 including the lamp 710 therein, and a collimator 720 refracting the light emitted from the lamp 710. In an exemplary embodiment, the lamp 710 includes a cold cathode fluorescent lamp or an external electrode fluorescent lamp. The lamp housing 715 includes an opened one side and surrounds the lamp 710 at remaining sides of the lamp 710. The open side of the lamp housing 715 faces the light guide area in the display apparatus 500. The lamp housing 715 includes the lamp 710 disposed therein and reflects a light, which is emitted backward from the lamp 710, in a forward direction of the lamp 710 towards the light guide area. The collimator 720 includes transparent material and is disposed in front of the lamp 710, between the lamp 710 and the light guide area. The collimator 720 may include a shape substantially in the form of a hemispherical convex lens to reduce an exit angle of the light emitted from the lamp 710. Alternatively, the collimator 720 may include a shape substantially in the form of a trapezoid to reduce the exit angle of the light, as well as the convex lens.

Each light source unit 705 may include a plurality of a light emitting diode (not shown) mounted on a light source substrate (not shown), and each of the collimators 720 disposed in front of each of the light emitting diodes.

The reflective sheet 730 reflects the light provided from the light source units 705. The reflective sheet 730 further includes a plurality of a light diffusion pattern 733 to diffusely reflect the light provided from the light source units 705. Each light diffusion pattern 733 has one of circular, oval and polygonal shapes in a plan view of the display apparatus 500. The light diffusion patterns 733 arranged on the center area of the reflective sheet 730 have relatively large planar areas, as compared with the light diffusion patterns 733 arranged on the light guide area adjacent to the light source units 705, as similarly shown in FIG. 9. The reflective sheet 730 specularly reflects the light in the light guide area and diffusely reflect the light in the center area, so that the light provided from the light source units 705 can be uniformly distributed.

The diffusion plate 740 is supported by one or more supporters 750 and disposed above the reflective sheet 730 while being spaced apart from the top surface of the reflective sheet 730 by a predetermined distance. In the illustrated embodiment, the diffusion plate 740 is supported by about six supporters 750 to about ten supporters 750, while being spaced apart from the reflective sheet 730 by the distance of about 4 mm. The distance between the diffusion plate 740 and the reflective sheet 730 may vary depending on an exit angle of the light emitted from the light source units 705. In exemplary embodiments, the distance may increase proportionally to the exit angle of the light.

The diffusion plate 740 may include a base plate 741 including polymer resin, which allows a light to pass therethrough, and light reflection patterns 745 disposed on one surface of the base plate 741 facing the reflective sheet 730. The light reflection patterns 745 may include one of metal and reflective ink to reflect the light. The diffusion plate 740 reflects the light incident into the light reflection patterns 745, and outputs the light incident into the base plate 741 by diffusing the light. The diffusion plate 740 guides the light emitted from the light source units 705 by using the light reflection patterns 745 together with the reflective sheet 730.

In the illustrated exemplary embodiment of the present invention, the diffusion plate 740 includes the light reflection patterns 745 arranged on the base plate 741, which have planar areas different from each other according to the distance relative to the light source units 705. Each light reflection pattern 745 has one of circular, oval and polygonal shapes.

As shown in FIG. 13, the light reflection patterns 745 arranged on a light incident area of the base plate 741 adjacent to the light source units 705, such a disposed at a transverse side of the diffusion plate 740, have relatively large planar areas, as compared with the light reflection patterns 745 arranged in the center area of the base plate 741. The diffusion plate 740 represents reflectivities different from each other in the light incident area and the center area, due to the light reflection patterns 745 having the planar areas different from each other in the light incident area and the center area. Where relative planar areas of light reflection patterns 745 decrease from a side where the light sources 705 are disposed toward the center of the diffusion plate 740 as shown in FIG. 13, relative planar areas of the light diffusion patterns 333 increase from the side where the light sources 305 are disposed toward the center of the reflective sheet 330 as shown in FIG. 9.

In the diffusion plate 740, the arrangement areas of the light reflection patterns 745 may be divided into a unit cell. Reflectivity of the unit cell may be calculated by averaging reflectivity of the light reflection patterns 745 based on the planar area of the light reflection patterns 745 and reflectivity of the base plate 741 based on a planar area of the base plate 741 including no light reflection patterns 745 disposed thereon. The planar area of the base plate 741 including no light reflection patterns 745 may be defined by a planar area of the diffusion plate 740 except for the planar area of the light reflection patterns 745. The reflectivity of the unit cell may be calculated by Equation 1 below.

$$R = \frac{A_{pat} \times R_{pat} + (A_{cell} - A_{pat}) \times R_{plate}}{A_{cell}} \quad \text{Equation 1}$$

In Equation 1, R represents the reflectivity of the unit cell, $A_{pat}$ represents the planar area of the light reflection patterns 745, and $R_{pat}$ represents the reflectivity of the light reflection patterns 745. Further, $A_{cell}$ represents a planar area of the unit cell, and $R_{plate}$ represents the reflectivity of the base plate 741.

Referring to Equation 1, the reflectivity R of the unit cell may vary depending on the planar area $A_{pat}$ of the light reflection patterns 745. In the diffusion plate 740, the reflectivity R of the unit cell arranged in the light incident area is relatively high and the reflectivity of the unit cell arranged in the center area is relatively low. The diffusion plate 740 reflects the lights, which are provided from the light source units 705 and the reflective sheet 730, in the light incident area, and then outputs the lights in the center area.

In the alternative exemplary embodiment of FIG. 14, the diffusion plate 740 includes the light reflection patterns 745 which includes a plurality of openings 747 disposed substantially across an entire surface of the base plate 741. The openings 747 have planar areas different from each other at different locations on the diffusion plate 740. The reflection patterns 745 of FIG. 14 is a continuous and indivisible member of the diffusion plate 740. Each opening 747 has one of circular, oval and polygonal shapes to expose the base plate 741. The openings 747 may be defined as a planar area of the diffusion plate 740 which does include material of the base plate 741, and does not include material of the reflection patterns 745.

Each of the openings 747 is considered a discrete and enclosed member of the diffusion plate 740. The diffusion plate 740 includes each of the enclosed openings 747 disposed on or extended into the base plate 741, such that the diffusion plate 740 solely defines the enclosed openings 747.

In the illustrated embodiment of FIG. 14, the openings 747 disposed on the entire surface of the base plate 741 have planar areas different from each other according to the distance relative to the light source units 705, such as disposed at the transverse sides of the diffusion plate 740, thereby exposing the base plate 741. The openings 747 disposed in the center area of the base plate 741 have relatively large planar areas, as compared with the openings 747 disposed in the light guide area of the base plate 741 adjacent to the light source units 705, such as at transverse sides of the diffusion plate 740. The diffusion plate 740 reflects the lights, which are provided from both the light source units 705 and the reflective sheet 730, by the light reflection patterns 745, and outputs the lights through the base plate 741 including the openings 747 by diffusing the lights.

Where relative planar areas of openings 747 increase from a side where the light sources 705 are disposed toward the center of the diffusion plate 740 as shown in FIG. 14, relative planar areas of the light diffusion patterns 333 also increase from the side where the light sources 305 are disposed toward the center of the reflective sheet 330 as shown in FIG. 9. In both FIGS. 13 and 14, a planar area of the light reflection patterns 745 decreases from sides where the light sources 705 are disposed toward the center of the diffusion plate 740, where light diffusion patterns 333 increase from the side where the light sources 305 are disposed toward the center of the reflective sheet 330 as shown in FIG. 9. A first area of the diffusion plate 740 may hereinafter be referred to as a planar area the light reflection patterns 745, and a second area may hereinafter to as a planar area of a remainder of the diffusion plate 740.

The diffusion plate 740 may have varying reflectivity in the light incident area and the center area according to planar areas of the openings 747. In the diffusion plate 740, the region of the openings 747 may be divided into a unit cell. Reflectivity of the unit cell may be calculated by averaging reflectivity of the base plate 741 based on the planar area of the openings 747 and reflectivity of the light reflection patterns 745 based on the planar area of light reflection patterns 745. The planar area of the diffusion plate 740 including the openings 747 may be defined by a planar area of the base file 741 except for the planar area of the light reflection patterns 745. The reflectivity of the unit cell may be calculated by Equation 2 below.

$$R = \frac{A_{open} \times R_{plate} + (A_{cell} - A_{open}) \times R_{pat}}{A_{cell}} \quad \text{Equation 2}$$

In Equation 2, R represents the reflectivity of the unit cell, $A_{open}$ represents the planar area of the openings 747, and $R_{plate}$ represents the reflectivity of the base plate 741. Further, $A_{cell}$ represents a planar area of the unit cell, and $R_{pat}$ represents the reflectivity of the light reflection patterns 745.

Referring to Equation 2, the reflectivity R of the unit cell may vary depending on the planar area $A_{open}$ of the openings 747. In the diffusion plate 740, the reflectivity R of the unit cell arranged in the light incident area is relatively high and the reflectivity of the unit cell arranged in the center area is relatively low according to the area of the openings 747. The diffusion plate 740 reflects the lights, which are provided from both the light source units 705 and the reflective sheet 730, in the light incident area, and then outputs the lights in the center area.

Referring again to FIG. 12, each supporter 750 includes a hole 755 passing through a body of the supporter 750 perpendicularly to a longitudinal direction of the supporter 750, so that transmittance of the light emitted from the light source units 705 can be improved. The hole 755 may extend completely through the body of the supporter 750.

The optical sheet 760 includes a prism sheet which collects the light passing through the diffusion plate 740. The optical sheet 760 may further include a reflective polarizing sheet (not shown) and a protective sheet (not shown) according to characteristics of the display apparatus 500.

The bottom chassis 800 receives the backlight unit 700 therein and is coupled to the reflective sheet 730, such as using an adhesive 735 disposed entirely between the bottom chassis 800 and the reflective sheet 730.

As described above, the display apparatus 500 can guide the lateral light using the reflective sheet 730 and the diffusion plate 740 instead of a light guide plate.

Although the exemplary embodiments of the present invention have been described, it is understood that the present invention should not be limited to these exemplary embodiments but various changes and modifications may be made by one ordinary skilled in the art within the spirit and scope of the present invention as hereinafter claimed.

What is claimed is:

1. A display apparatus comprising:
a display panel which displays images and includes a light incident surface;
a reflective sheet disposed overlapping the light incident surface of the display panel to reflect a light and including at least one light diffusion pattern disposed on an upper surface thereof facing the light incident surface of the display panel, wherein the light diffusion pattern diffusely reflects lateral light incident on the upper surface, to guide the lateral light toward the display panel;
a plate disposed between the reflective sheet and the display panel, and spaced apart from the reflective sheet by a predetermined distance, wherein the plate selectively reflects and transmits the light provided from the reflective sheet according to an incident angle of the light;
a light source unit disposed adjacent to at least one edge of the display panel in a plan view, wherein the light source unit generates the light and the light is emitted to a space between the plate and the reflective sheet; and
a supporter interposed between the reflective sheet and the plate to support the plate, wherein the supporter includes a hole passing through a body of the supporter substantially perpendicularly to a longitudinal direction of the supporter,
wherein the plate comprises a plurality of prisms disposed on a lower surface thereof facing the reflective sheet.

2. The display apparatus of claim 1, wherein the light source unit comprises:
a light source which generates the light of the light source unit; and
a collimator which refracts the light to control an exit angle of the light emitted from the light source.

3. The display apparatus of claim 2, wherein the collimator is a convex lens and controls the exit angle of the light in a range of about 10° to about 60°.

4. The display apparatus of claim 3, wherein the light source unit further comprises a light source substrate, and the light source comprises a light emitting diode disposed on the light source substrate.

5. The display apparatus of claim 4, wherein the light emitting diode and the collimator define a continuous and indivisible unit.

6. The display apparatus of claim 1, wherein the plate is spaced apart from the reflective sheet by the predetermined distance of about 4 millimeters or more.

7. The display apparatus of claim 6, wherein the prisms of the plate are longitudinally extended arranged in parallel to a travelling direction of the light emitted from the light source unit.

8. The display apparatus of claim 7, wherein the plate further comprises a light transmission pattern disposed on an upper surface thereof facing the display panel, to improve a transmittance of the light.

9. The display apparatus of claim 8, wherein the light transmission pattern comprises ink, which comprises one of polyvinyl chloride and acryl, and diffuser mixed with the ink.

10. The display apparatus of claim 1, further comprising a bottom chassis which receives the light source unit, the reflective sheet, and the plate therein.

11. The display apparatus of claim 10, wherein the reflective sheet further includes a protrusion which protrudes toward the plate.

12. The display apparatus of claim 1, wherein the reflective sheet includes a material to specularly reflect the light.

13. A display apparatus comprising:
a display panel which displays images and includes a light incident surface;
a reflective sheet disposed overlapping the light incident surface of the display panel to reflect a light, and including at least one light diffusion pattern disposed on an upper surface thereof facing the light incident surface of the display panel, wherein the light diffusion pattern diffusely reflects lateral light incident on the upper surface toward the display panel;
a diffusion plate disposed between the reflective sheet and the display panel and spaced apart from the reflective sheet by a predetermined distance, wherein the diffusion plate selectively reflects and transmits the light provided from the reflective sheet according to an incident angle of the light;
a light source unit disposed adjacent to at least one edge of the display panel in a plan view, wherein the light source unit generates the light and the light is emitted to a space between the plate and the reflective sheet; and
a supporter interposed between the reflective sheet and the diffusion plate to support the plate, wherein the supporter includes a hole passing through a body of the supporter substantially perpendicularly to a longitudinal direction of the supporter,
wherein the diffusion plate comprises a plurality of light reflection patterns disposed on a lower surface thereof facing the reflective sheet, to reflect the light.

14. The display apparatus of claim 13, wherein the light source unit comprises:
a light source which generates the light of the light source unit; and
a collimator which refracts the light to control an exit angle of the light emitted from the light source.

15. The display apparatus of claim 13, wherein the light reflection patterns of the diffusion plate arranged in a light incident area adjacent to the light source unit have relatively large planar areas as compared with the light reflection patterns arranged in a center portion of the diffusion plate.

16. The display apparatus of claim 15, wherein the light reflection patterns comprise one of metal and reflective ink.

17. The display apparatus of claim 13, wherein the light reflection patterns of the diffusion plate comprise one of a metal layer and a reflective ink layer disposed on substantially an entire of the lower surface of the diffusion plate, and comprise openings which allow the light to pass therethrough in a unit area.

18. The display apparatus of claim 17, wherein the openings of the light reflection patterns disposed in a center portion of the diffusion plate have relatively large planar areas as compared with the openings disposed in a light incident area adjacent to the light source unit.

19. The display apparatus of claim 13, wherein the reflective sheet includes a material to specularly reflect the light.

* * * * *